Patented June 23, 1925.

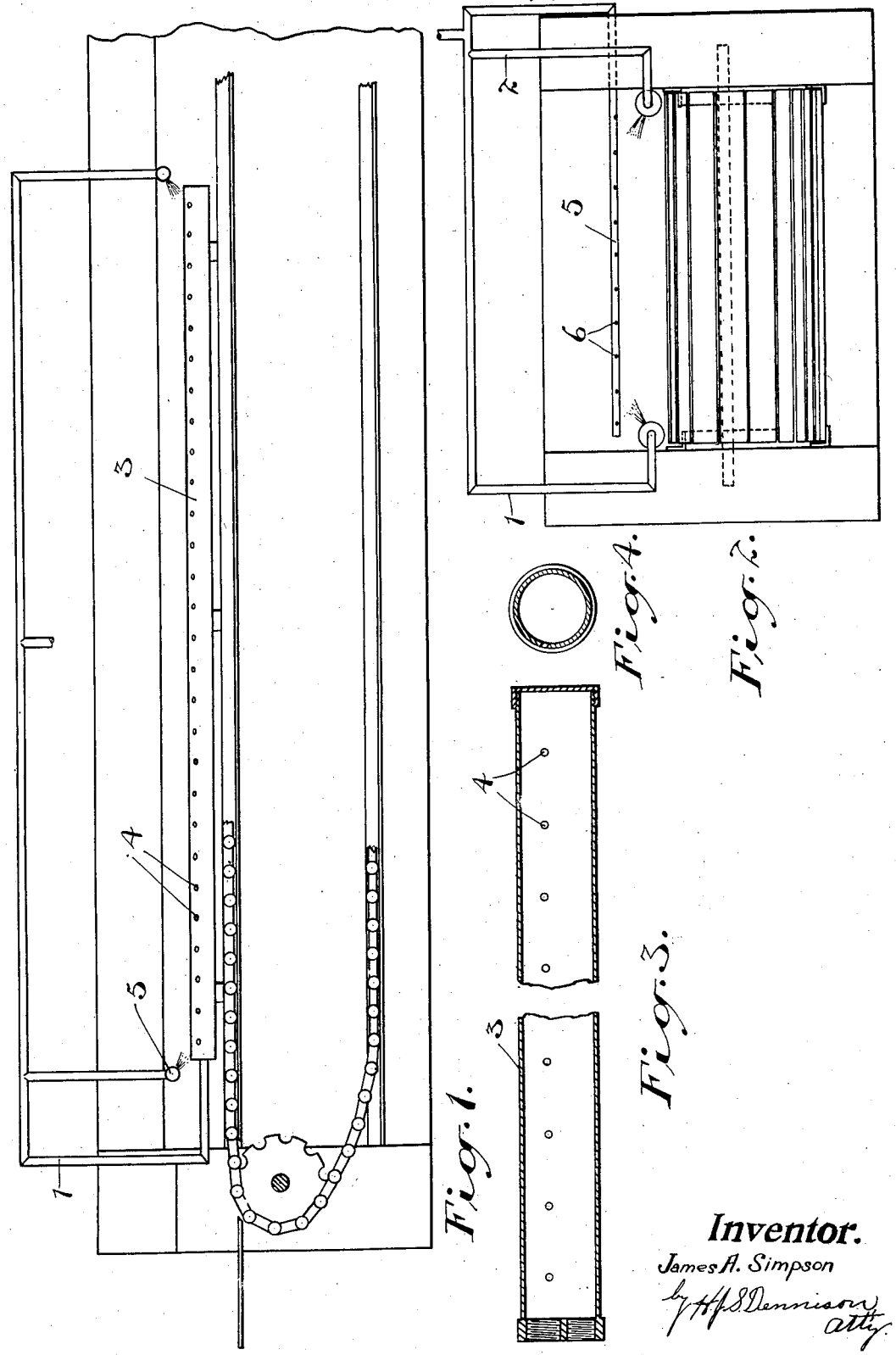

1,543,128

UNITED STATES PATENT OFFICE.

JAMES A. SIMPSON, OF TORONTO, ONTARIO, CANADA.

BAKER'S OVEN.

Application filed January 31, 1924. Serial No. 689,672.

*To all whom it may concern:*

Be it known that I, JAMES A. SIMPSON, a subject of the King of Great Britain, and resident of the city of Toronto, county of York, Province of Ontario, in the Dominion of Canada, have invented certain new and useful Improvements in Bakers' Ovens, as described in the following specification and illustrated in the accompanying drawings, that form part of the same.

The principal objects of this invention are, to accomplish a uniform baking of bread without bursting the loaves on top, producing loaves with a rich gloss and uniform color.

The principal feature of the invention consists in the novel manner of distributing and maintaining softened or low pressure steam in a pocket in the oven by means of barriers of high pressure steam arranged transversely of the oven.

In the drawings, Figure 1 is a diagrammatic sectional view of a continuous type of oven illustrating the application of my invention thereto.

Figure 2 is an end elevational view.

Figure 3 is an enlarged longitudinal sectional detail of one of the expanding chambers for softening the steam.

Figure 4 is a cross sectional view of the softening chamber.

In the baking of bread in a travelling oven it has been found extremely difficult to produce a uniform product because of the rapid escape of moisture from the loaves. Further, great difficulty has been experienced in obtaining a uniform expansion of the loaves.

The present invention accomplishes the desired result in a very simple manner. The steam is conducted to the oven chamber through the pipes 1 and 2 and is directed into the large tubes 3 which are sufficiently large in cross section to produce a considerable expansion. These tubes are provided with perforations 4 arranged on the upward and inward side to project the steam inwardly toward the centre of the oven. The steam thus projected, would under ordinary circumstances flood the oven from end to end, but this is not desirable as the steam chamber is only required at the initial end of the oven and for about one-third of its length in order to give the proper expansion to the loaf under the heat.

In order to confine the steam I have arranged the steam pipes 5 transversely of the oven at the end limits of the steam pocket desired. These pipes are perforated with fine holes 6 which project sheets of steam downwardly and inwardly and the steam directed through these pipes 5 is of considerably higher pressure than the steam delivered to the chamber from the pipes 3.

The curtains of high pressure steam thus produced serve effectively to hold the softer steam in place in the pocket and the loaves carried by the travelling bottom move through this steam pocket and attain their expansion without splitting and a surface moisture is produced which results in the baking of the loaf in its further travel through the oven to a fine and uniform color with a rich glaze.

What I claim as my invention is:—

1. A bakers' oven having means for distributing steam therein, and means arranged transversely of the oven to project sheets of steam to form effective barriers to retain the steam in a limited area.

2. In a bakers' oven, means for distributing steam therein, and perforated pipes arranged transversely of the top of the oven at each end of a defined area to project sheets of steam downwardly and inwardly from the ends of the oven to form barriers to maintain the steam in a defined area.

3. In a bakers oven, steam distributing pipes arranged longitudinally thereof and steam pipes arranged transversely at the ends of said longitudinal distributors and at the top of the oven, said transverse pipes directing steam downwardly and inwardly forming barriers to confine the steam discharged from the longitudinal pipes in a definite area.

4. A travelling bakers' oven having steam pipes arranged longitudinally within the baking chamber for a portion of its length, said pipes having a plurality of openings therein directed upwardly and inwardly, feed pipes of considerable less diameter than said distributor pipes leading thereto, high pressure steam pipes arranged transversely of the oven adjacent to the ends of said longitudinal pipes, said transverse pipes having perforations arranged to project sheets of steam downwardly and inwardly to form a steam pocket above the travelling oven bottom.

JAMES A. SIMPSON.